Patented July 23, 1940

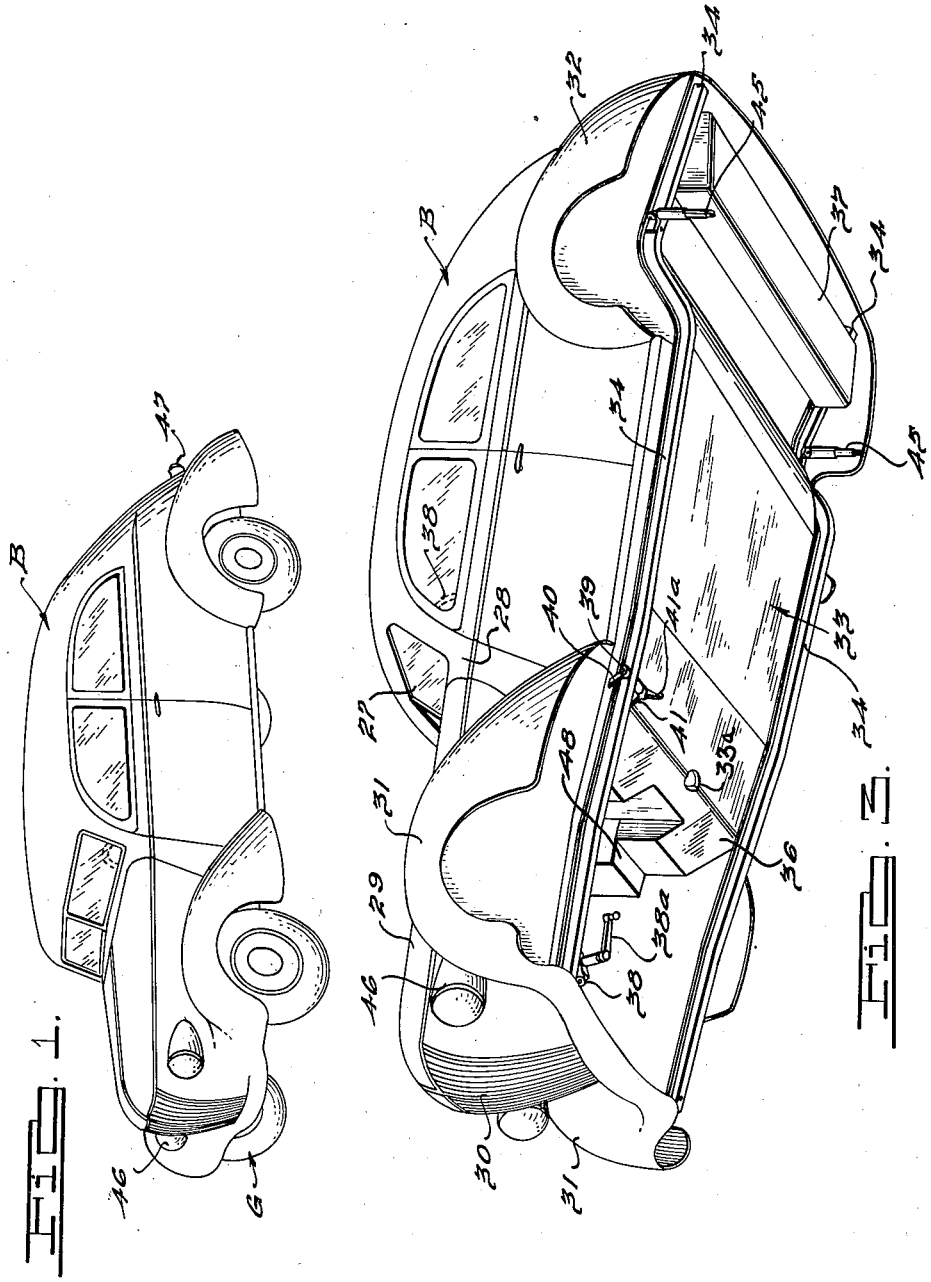

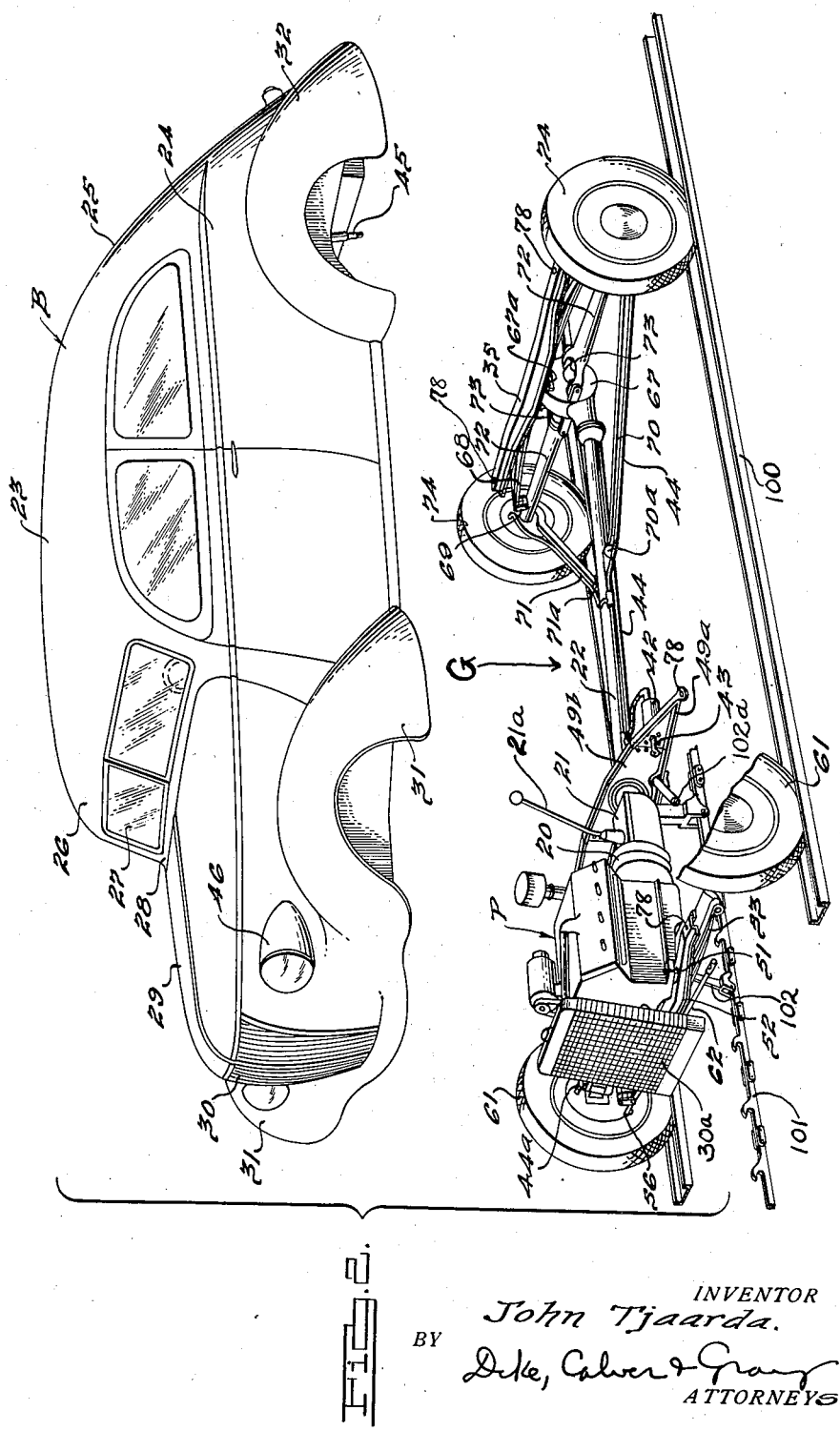

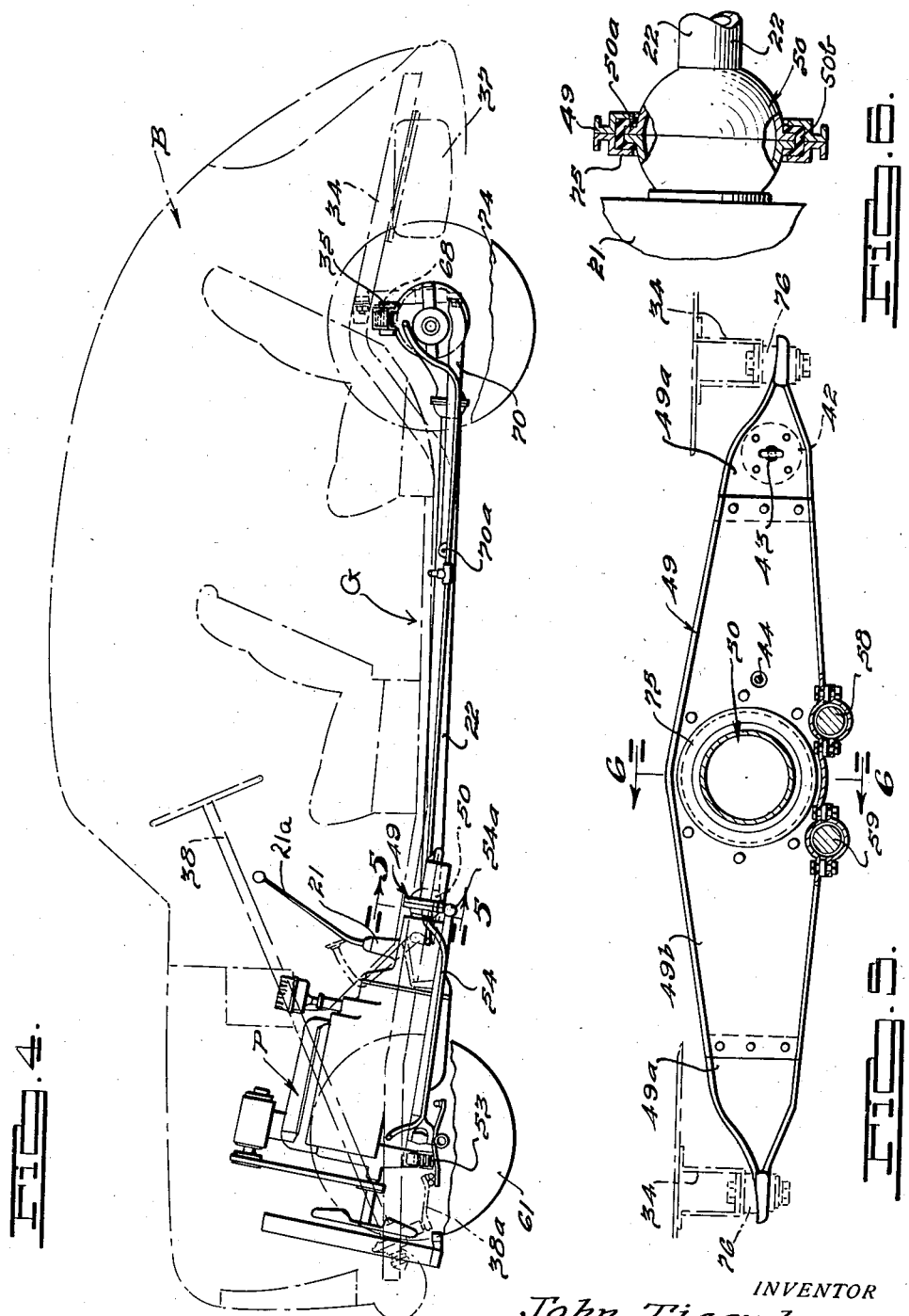

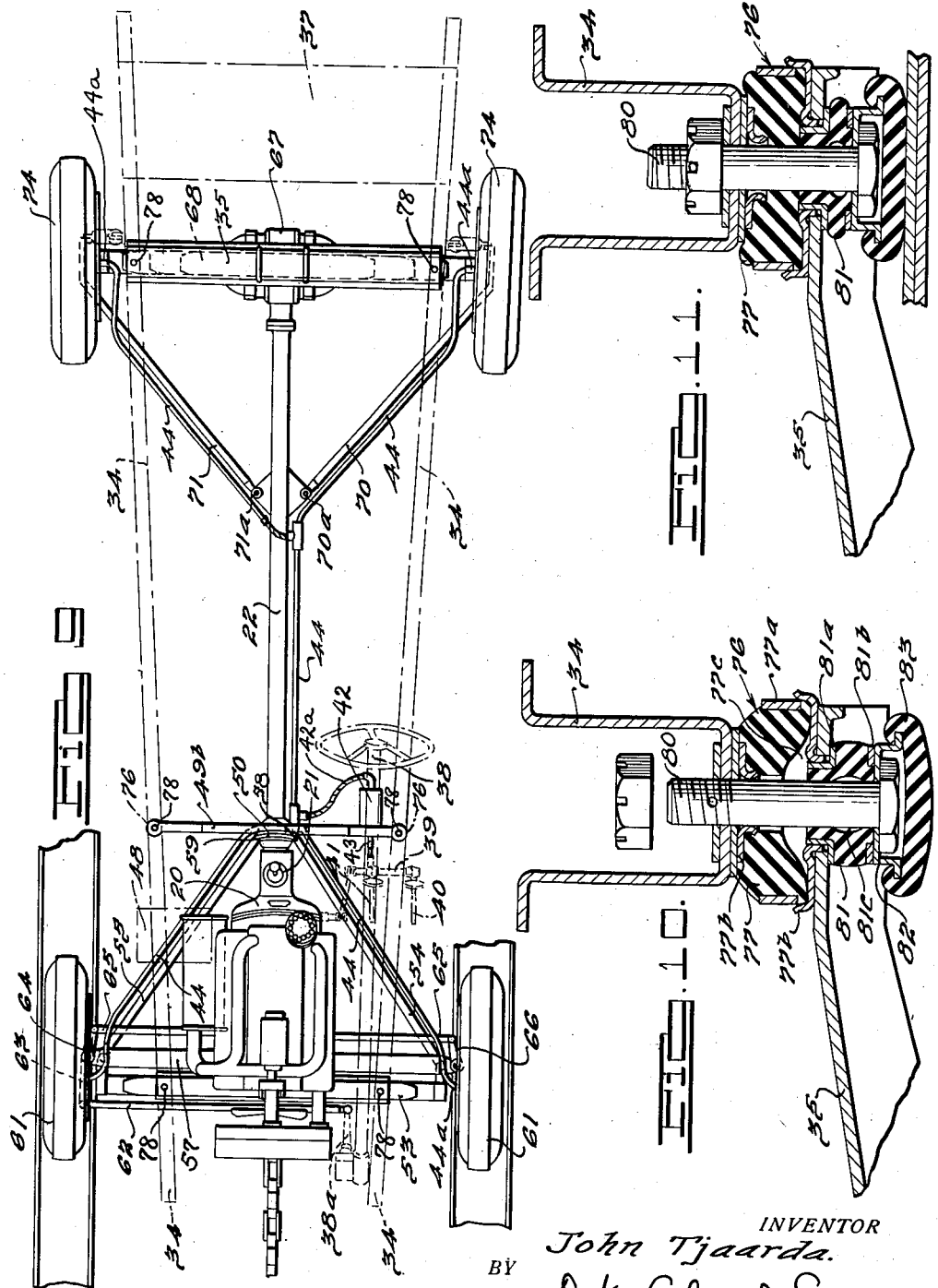

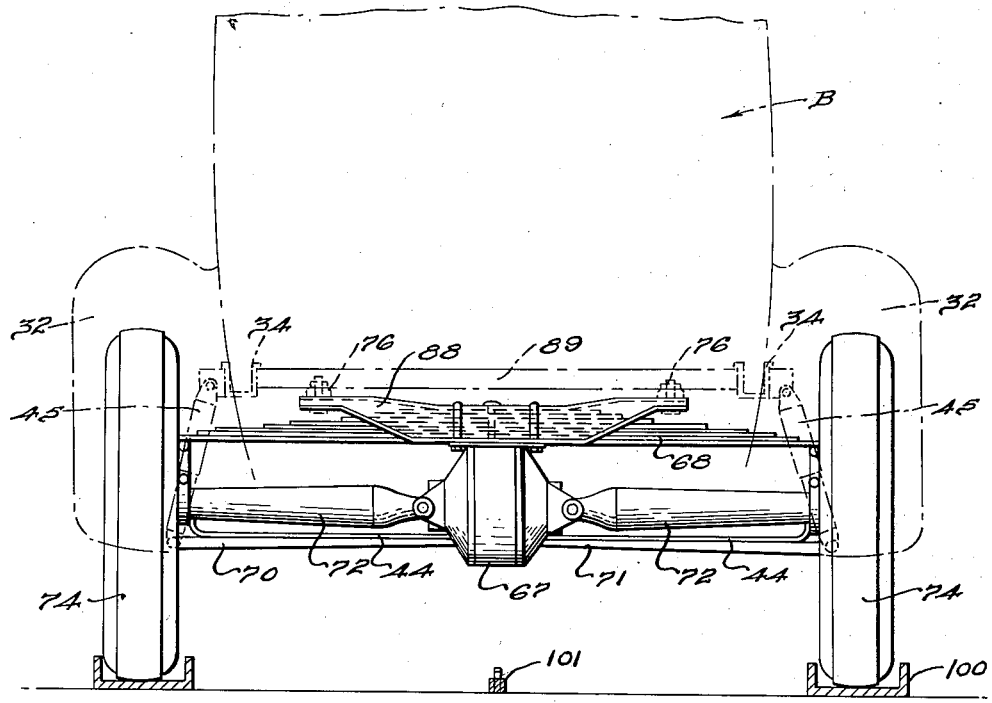

2,208,709

UNITED STATES PATENT OFFICE 2,208,709

MOTOR VEHICLE

John Tjaarda, Birmingham, Mich., assignor to Briggs Manufacturing Company, Detroit, Mich., a corporation of Michigan Application September 7, 1937, Serial No. 162,568

10 Claims. (Cl. 180—1)

This invention relates to motor vehicles and more particularly to motor vehicles having sprung body structures. In one of its aspects the invention relates to an improved method of building such motor vehicles.

In the practice of manufacturing automobiles according to present day procedure, particularly in cases of large scale production, the general plan of manufacture has been to divide the motor vehicle structurally into two major units, the so-called chassis unit and the body unit. The manufacture and assembly of these units is divorced one from the other and carried out in separate plants after which the units are assembled at the chassis plant. The chassi unit generally comprises a rigid skeleton or frame composed of longitudinal steel beams, usually of channel formation, and cross members, together with the power plant and associated parts, the running gear including wheels, axles and spring suspensions, and the entire steering and braking mechanisms, which latter are mounted upon the frame. The body unit generally comprises a box-like structure either of composite wood and metal construction or of all metal fabrication. Such body unit has in some instances been fabricated with a base frame composed of longitudinal and cross members of metal carrying a skeleton wood framework covered with a sheathing composed of pressed metal panels. In other instances the entire framework as well as the side, back and roof paneling has been fabricated of metal. The chassis unit frame members have been designed to carry substantially all stresses imposed upon the vehicle in operation, including those resulting from the weight of the engine and body, from the driving thrust, the torsional reactions and so forth. The body unit has, on the other hand, been designed and built mainly to carry the stresses imposed by the weight of the passengers, by the wind resistance and other relatively light forces.

Thus, by reason of the foregoing practice it has been possible to divorce the manufacture of the so-called body and chasis units and to produce these units in separate plants. Thereafter the body unit is transported to the chassis or so-called automobile plant and assembled thereon at the assembly line simply by dropping the body unit onto the chassis unit and bolting, riveting or welding the body base frame members to the chassis frame members. In conjunction with this system of assembly it has been necessary to assemble separately to the chassis unit the pressed metal fenders and hood units, the radiator assembly including the pressed metal radiator shell and ornamental grille, and the head lamps, and to assemble in the body unit many other parts of the mechanical and electrical equipment for controlling the operation of the vehicle, such as steering wheel and column mechanism, brake, clutch and gear shift mechanism, ignition and lamp control mechanism, and so forth.

Thus, it will be seen that after the completion of the body unit at the body manufacturing plant, minus of course certain front and rear end parts, such as front and rear fenders, hood, radiator shell and grille (all of which are strictly body parts but are generally separately made and assembled on the car), it is necessary at the final assembly plant for workmen and mercanics to work in and out of the body to complete the assembly of much of the mechanical control equipment. Since the body unit at this time is finished interiorly as to upholstery and trim, there is considerable danger of soiling the upholstery fabric and trim and marring finished parts due to mechanics working in and out of the body at the final assembly line. Moreover, where it is thus necessary to complete the body at the final chassis and body assembly line by installing the fenders, radiator shell and grille assemblies, hood, head lamps, etc., and to carry out many assembly operations in respect to the mechanical and electrical equipment mounted in whole or in part within or on the body, longer final assembly lines are necessary, many delays and much extra time is necessitated in completing the car, considerable duplication of effort and increased labor expense results, and additional plant space is required, all of which result in increased cost of manufacture and reduced output.

A further disadvantage arising from the foregoing practice has been in respect to the transportation of the body units as well as other stamped metal parts (which are essentially body parts) from the body manufacturing plant to the final assembly plant. The body units, which are large and bulky, are transported, and often considerable distances, on trucks or trailers from the body plant to the chassis plant. The capacity of such trucks or trailers is limited owing to the bulk of the bodies and to limitations in the size of the trucks or trailers as a result of city ordinances. The bodies must be carefully loaded to avoid damage thereto. Considerable manual labor is required in loading and unloading the finished bodies, and valuable time is consumed not only in these operations but also in transportation. Bodies which are rejected at the chassis plant because of faults in the body must be handled, loaded, shipped back to the body plant and unloaded for repairs and then returned to the chassis plant.

Moreover, fender, hood, radiator shell and grille stampings, etc., usually made at the body plant and finish coated, are also shipped from the body plant to the final assembly plant. These parts must also be carefully loaded and crated, requiring considerable handling, and hence much time and expense results from this procedure also.

It will be seen, therefore, that great disadvantages result from preesnt day methods as above described. Many of these disadvantages have been pointed out. They have resulted in greatly increasing the cost of automobile manufacture. They have not permitted proper separation of manufacturing activities between the chassis and the body plants in accordance strictly with the types of parts to be produced and manufacturing methods employed. They have required that the body unit and separated body parts (fenders, hoods, etc.) be fabricated and finished at one locality and then brought to the chassis or running gear unit at another locality. A wasteful duplication of equipment and maintenance of substantially parallel manufacturing departments became necessary, resulting from the fact that the vehicles have been so designed that the chassis thereof include many parts which can be more economically manufactured by body plants and which are from the manufacturing standpoint really parts of the body. Such are the rear and the front fenders, gasoline tank, the hood, the radiator shell and grille, and so forth. Such stamped pressed or rolled metal parts, including the chassis frame members are seldom produced at the chassis plants as they can be more economically produced outside, as by the body plants, and in such case they must be transported to the assembly plants at great expense.

Thus, considerable waste and delays occur in the industry on account of the present day methods of making and assembling motor vehicles. The situation has become still more serious, and increasingly difficult problems have been presented, by the advent of the so-called unitary body and chassis constructions, in which the conventional chassis frame is entirely eliminated and the body frame is made strong enough to carry all operation stresses. A vehicle of the above type is built and assembled as a single unit, and there is no separation of the structure into the body and the chassis.

An important object of the present invention is to overcome and largely eliminate the foregoing difficulties and disadvantages, and to provide a method whereby the body unit and main frame may be incorporated together and the body completed with substantially all parts thereon including mechanical and electrical equipment, whereupon the running gear and power plant parts, either separately or as a unit, may be installed directly upon the bottom of the body. In other words the present method permits, if desired, the running gear parts to be brought to the fully completed body and applied thereto to complete the car, thereby eliminating as may be desired or expedient, all transportation problems and expense in respect to the shipment of finished bodies and body parts from one plant to another.

Another object of the present invention is to provide an improved motor vehicle which can be manufactured in two separate units, a body unit and a running gear unit, said running gear unit being adapted to be assembled onto the body unit.

Another object of the invention is to provide an improved motor vehicle in which the body unit includes substantially all large stampings which are manufactured and finally assembled into a vehicle body at the body plant.

Still another object of the invention is to provide an improved motor vehicle in which the body unit is manufactured in a body plant, and the frame, gasoline tank, fenders, radiator grille, engine hood, steering column, shock absorbers, brake and clutch pedal controls, and several other parts heretofore considered to be inherent parts of the chassis are finally assembled into the body during the manufacture thereof and form its constructional parts.

A further object of the invention is to provide a vehicle body of the above character, thereby permitting the body so constructed to be shipped to a running gear plant, or the running gear as such to be shipped to the body plant, wherein the assembly of the vehicle is completed by attaching the running gear to the body.

A still further object of the invention is to provide a motor vehicle which is finally assembled by attaching the running gear thereto, the same being done from beneath and without the necessity of even opening the doors of the finally assembled body, thus preventing tearing and soiling the upholstery thereof or marring or damaging the interior finish of the body.

A still further object of the invention is to provide a novel method whereby motor vehicles are built and assembled in a quicker, simpler and cheaper manner.

Other objects of this invention will appear in the following description and appended claims, reference being had to the accompanying drawings forming a part of this specification wherein like reference characters designate corresponding parts in the several views.

Fig. 1 is a perspective view of a motor vehicle constructed or produced in accordance with the present invention, said vehicle being shown finally assembled.

Fig. 2 is an exploded view showing the body unit and the running gear or chassis unit just before the same are assembled together.

Fig. 3 is a perspective view of the finally assembled body structure, looking from beneath.

Fig. 4 is a side view of the running gear, the outline of the body structure being shown in dotted lines.

Fig. 5 is a view taken in the direction of the arrows on the line 5—5 of Fig. 4.

Fig. 6 is a vertical sectional view taken on line 6—6 of Fig. 5, looking in the direction of the arrows.

Fig. 9 is a top view of the running gear, the respective positions of the sills and of the gasoline tank being indicated thereon in dotted lines.

Fig. 10 is a sectional view of a resilient bumper, the same being shown with the rubber parts shown uncompressed.

Fig. 11 is a view similar in part to that of Fig. 10, the bumper being shown with the rubber parts in compressed condition.

Fig. 12 is a rear view of a motor vehicle constructed in accordance with the invention and provided with a rear wheel suspension of a modified construction.

Figure 7:
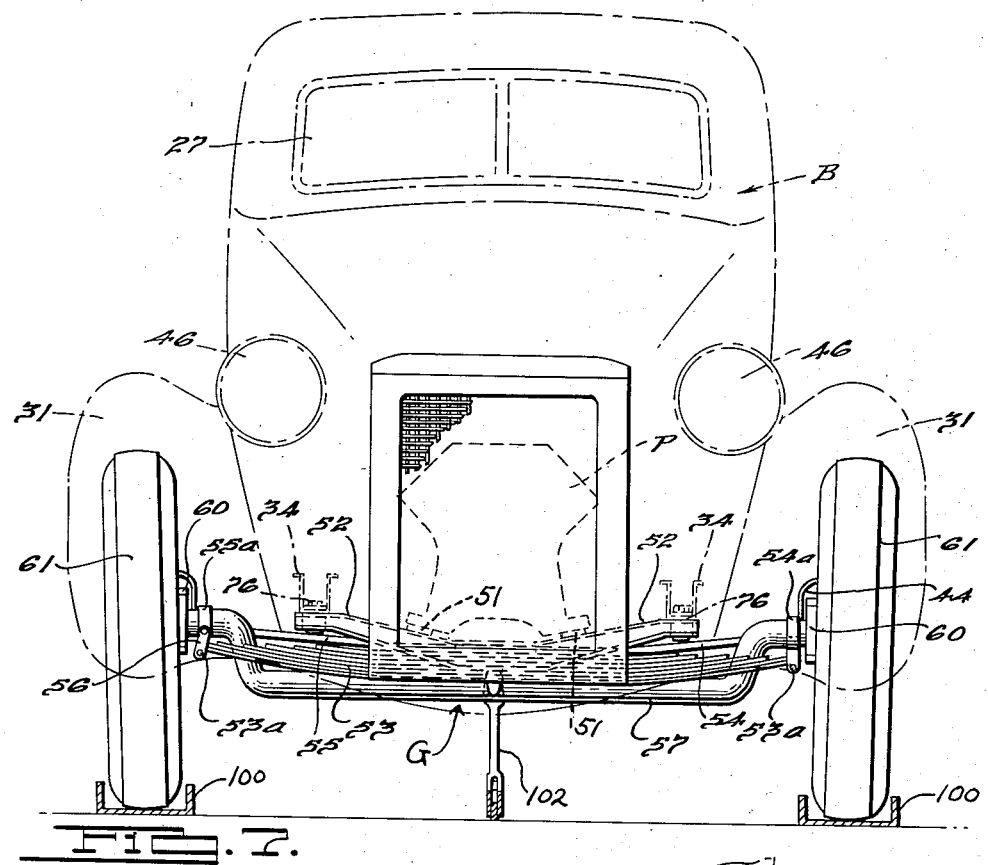
Fig. 7 is a front view of the structure of Fig. 4.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle constructed or produced in accordance with one embodiment of the present invention. Referring to the drawings and more particularly to Figs. 1 to 4 inclusive, the vehicle comprises a body unit generally indicated by the character B and a running gear or chassis unit generally indicated by the character G. In the illustrated embodiment the running gear unit comprises a power plant assembly P including a clutch 20 and a transmission 21, a front wheel suspension provided with steering linkage, and a rear wheel suspension including, for example, a full floating axle of the swinging half-axle type having a final drive mechanism connected with the transmission shaft of the transmission 21 by means of a propeller shaft assembly indicated generally by the numeral 22. The body unit B comprises a passenger compartment of any suitable design and is preferably made sufficiently rigid to carry a considerable part of the operation stresses, preferably being constructed on a unitary body-and-chassis structure principle. It will be understood, however, that the present invention is not limited to such unitary body-and-chassis structures and that it may be successfully applied to vehicles with bodies designed to carry only the lighter of the operation loads.

The passenger compartment of the body is formed by the roof panel 23, side panels 24 having suitable doors and windows provided therein, a rear panel 25 forming an extension of the roof panel and provided with a rear window, not shown, and a front roof panel 26 provided with a windshield 27, said front panel 26 forming an extension of the main roof panel and merging smoothly into the front end unit 28 comprising the front body pillars and cowl. The engine hood 29 is adapted to be secured to said cowl 28, a radiator grille 30 of suitable design being provided in front of the engine hood. Front fenders 31 and rear fenders 32 are secured to the body structure at the sides thereof and constitute structural parts thereof.

At the bottom of said passenger compartment there is provided a rigid floor structure indicated generally by numeral 33 comprising a pressed metal floor pan to which are bolted, welded or otherwise secured longitudinally extending frame members or sills 34 preferably of a flanged channel cross section. The sills 34 are bent as best shown in Figs. 3 and 4 in order to permit the free movements of the rear and the front axles. The front portions of the sills 34 are secured to the front end unit 28 and to the lower portions of the panels forming the power plant compartment, thus imparting a sufficient rigidity thereto. A dash 36 is provided in front of the passenger compartment and it separates the same from the power plant compartment. A gasoline tank 37 is secured to the rear ends of the sills 34.

It is an important feature of the present invention that the steering column assembly 38 is secured to the body and constitutes a structural part thereof, the steering mechanism associated with said column, including the pitman arm 38a protruding therefrom, being mounted on the body unit, as shown in dotted lines in Fig. 4. The pitman arm is adapted to be connected in the process of final assembly to the rest of the steering linkage carried by the running gear.

A clutch control cross shaft 39 is journalled in the left hand sill 34, to which shaft the clutch pedal 40 is operatively connected. Connections between this shaft and the clutch of the power plant are provided on the body unit as shown in dotted lines in Fig. 9. The brake pedal, also carried by the body unit is rotatably mounted on the shaft 39. Shock absorbers 45 are secured to the sills 34 near the rear ends thereof and are adapted to be connected to the rear axle during the final assembly of the vehicle.

Headlights 46 and tail-lights 47 of any suitable construction are finally secured onto the body at the front and the rear thereof, suitable wiring and switches (not shown) being provided in the body for the purpose of connecting the lights to the battery. A battery 48 is secured to the floor structure at the front thereof in such a manner as to enable convenient connection thereof to the starting and ignition equipment of the power plant.

The body unit constructed as herein shown and described is finally assembled in a body plant and may be shipped to the final assembly plant locked, since the running gear and the power plant may be secured onto the body from beneath and without the necessity of the workmen entering the body. The only running gear part protruding into the body is the gear shifting lever 21a, the same being adapted to pass in the process of final assembly through the opening 33a provided in the floor structure 33. Soiling of the expensive upholstery by oily hands and clothes of the workmen and accidental tearing thereof by the tools used during the final assembly are thus eliminated. Under certain conditions it may be advantageous to assemble the radiator core 30a (shown carried by the running gear in Fig. 2) to the body, the hose connections thereof being conveniently accessible during the final assembly for connecting the radiator by means of rubber hoses to the power plant cooling system.

The power plant P is preferably assembled to the running gear unit before the latter is assembled with the body unit B, as shown in Fig. 2. In the present instance there is provided at the rear end of the transmission 21 a universal joint assembly 50 through which a flexible power connection between the transmission shaft and the propeller shaft 22 is effected. The power plant is supported at two points on the front transverse member 52, rubber blocks 51 being provided at said points, as shown in Figs. 2 and 7. The member 52 is made of a flanged channel cross section opening downwardly, and its middle portion is made concaved for the purpose of a more convenient attachment of the front spring where a transverse spring is used. The member 52 is adapted to be bolted or otherwise secured in the process of final assembly by its extremities to the longitudinal sills 34 of the body unit. To the member 52 is suitably secured, such as by means of clamp bolts, a transverse laminated spring 53 at the ends of which there are provided eyelets 53a for pins by means of which the left side end of the spring is connected to the forwardly protruding extension 54a of the left hand radius rod 54, while between the forwardly protruding extension 55a of the right hand radius rod 55 and the corresponding end of the spring there is provided a shackle 56.

The front ends of the radius rods 54 and 55 rearwardly of the spring connections are supported at the ends of a drop type front axle 57, while the rear ends thereof are secured by means of ball and socket joints 58 and 59 to a central transverse member generally designated at 49, see Figs. 5 and 9. The ends of the axle 57 are fitted with suitable steering knuckles 60 carrying front steering wheels 61.

The central transverse member 49 is made in the form of a short I-beam with converging ends 49a riveted or otherwise secured to the main body portion 49b thereof, the ends 49a being adapted to be connected in the process of final assembly to the longitudinal sills 34.

The steering mechanism carried by the running gear comprises a drag link 62 extending transversely of the vehicle, its right end being hingedly connected to the end of the right hand steering arm 63 extending forwardly and rearwardly of the point 64 in the middle thereof at which point the arm is rigidly secured to the right hand steering knuckle 60. The rear end of the arm 63 is connected to the right hand end of a tie rod 65, the left hand end of said rod being secured to the left hand steering arm 66 rigidly secured to the left hand steering knuckle 60, see Fig. 7.

It will now be understood in view of the foregoing that for the purpose of connecting the steering mechanism to the steering column assembly secured to the body, it is merely necessary to connect the pitman arm 38a to the left hand end of the drag link 62 (see Fig. 9) which can be easily and simply done in the process of final assembly. By means of the above described construction, and particularly because of the provision of a single shackle 56 on the spring 53, transmission to the steering column of the side shocks received by the front wheels is effectively minimized.

Figure 8:
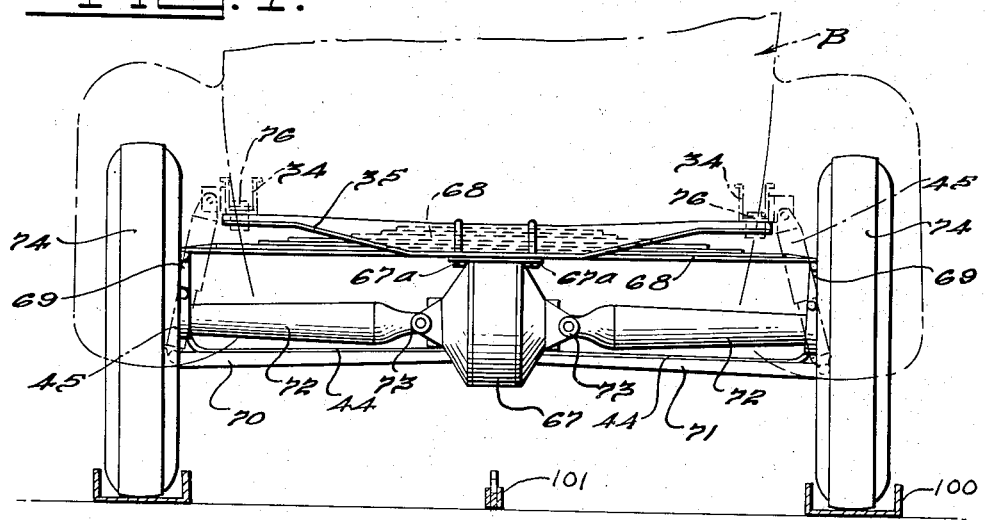
Fig. 8 is a rear view of the structure shown in Fig. 4.

The rear axle assembly herein employed is of the swinging half-axle type, such for instance as is described in detail in the co-pending application of John Tjaarda, filed February 1, 1935, Serial No. 61,861. Referring to Figs. 2, 8 and 9 the rear axle of the above type comprises generally a differential and a final drive mechanism arranged in a suitable housing 67 secured to the rear spring 68 by means of brackets 67a. The spring 67 is secured to a rear transverse member 35 similar in construction to the front transverse member 52, the member 35 being adapted to be connected in the process of final assembly to the longitudinal sills 34. The ends of the spring 68 are shackled as at 69 to the rear ends of the rear radius rods 70 and 71 supported on the ends of the rear axle half housings 72, the front ends of said radius rods 70 and 71 being secured by means of ball and socket connections 70a and 71a to the propeller shaft housing. Double universal joints 73 (Fig. 8) are provided on both sides of the differential and final drive mechanism in order to effect transmission of power to the rear wheels 74 and effect independent suspension thereof by means of a single transverse spring. The rear wheels 74 are operatively arranged on the rear axle by means of a conventional full floating construction. The final drive shaft (not shown) and the propeller shaft may be set at a constant included angle of less than 180°, the vertex of said angle being directed downwardly, such, for instance, as described in the co-pending applications of John Tjaarda, Serial No. 85,219, filed June 15, 1936, and Serial No. 94,648, filed August 6, 1936.

The central portion 49b of the transverse member 49 is adapted to be floatingly secured to the flanges 50a of the universal joint housing 50, the latter passing through the hole provided in the member 49 and cooperating with the portion 49b thereof with its flanges 50a. A flanged ring 75 is adapted to engage the flanges of the member 49 and to cooperate with the flanges 50a from the opposite side, and it is riveted or otherwise secured to the central portion 49b, see Figs. 5 and 6. A rubber mounting ring 50b fits over the flanges 50a of the universal joint 50 and is clamped under suitable compression within the recess formed by the ring 75 and member 49, thereby providing a third point of support of the engine. It will be understood that by the above described construction a three-point floating mounting of the power plant assembly is effected, and the operation vibrations of the engine are absorbed by the rubber blocks 51 and the mounting ring 50b instead of being transmitted to the transverse members 52 and 49.

The brake operating mechanism, with the exception of the brake pedal 41, is mounted on the running gear. A hydraulic master cylinder 42 is secured to the left hand portion 49a of the transverse member 49. From the master cylinder the brake operating fluid is conducted through a conduit 42a to a distributing head whence it is delivered to pipes 44. The pipes 44 delivering the brake operating fluid to the wheel cylinders of the brakes of the front wheels 61 are carried by the front radius rods 54 and 55 and are connected to the wheels with the aid of suitable couplings 44a. The pipe 44 delivering the brake operating fluid to the wheel cylinders of the brakes of the rear wheels 74 runs along the propeller shaft 22 and separates into two conduits carried by the rear radius rods 70 and 71, said conduits being connected to the rear wheel brakes with the aid of couplings 44a. The master cylinder contains the usual reciprocating piston operated by a piston rod 43 shiftable through a hole in the extension 49a of the cross member 49, see Figs. 5 and 9.

Thus the entire braking system with the exception of the pedal 41 is assembled onto the running gear, and in the process of final assembly it is only necessary to connect the master cylinder piston rod 43 to the depending extension 41a of the brake pedal 41, the same being easily done from beneath the body.

The process of final assembly of the motor vehicle constructed in accordance with the present invention is very simple. The body unit B may be lowered onto the running gear unit G and the ends of the transverse members 52, 49 and 35 are connected to the longitudinal sills 34; the steering column assembly and the brake pedal are connected to the steering linkage and the brake operating mechanisms as described above. The shock absorbers are connected to the axle by very simple operations.

It will now be clear in view of the foregoing that load carrying connections between the body and the running gear are effected at six points (indicated by the numeral 78) where the ends of said transverse members 35, 49 and 52 are secured (in the process of final assembly) to the longitudinal sills 34 of the body unit. In order to prevent a continuous metal path from the running gear to the body, connectors generally indicated by the numeral 76 and illustrated in Figs. 10 and 11 are provided at places of connection of said transverse members and sills. Referring to Figs. 10 and 11, the connectors comprise an annular rubber member 77 provided with an armor ring 77a and washers 77b, a hole being provided in said member 77 for passage of a bolt 80. The rubber member 77 is adapted to be disposed between the respective cross member (one of the three cross members 35 being illustrated) and the sill 34, the bolt 80 passing through both of said members. Between the head of the bolt 80 and the end of the respective cross member there is arranged a second annular rubber member 81 provided with armor pieces 81a and 81b. The bolt 80 is adapted to carry an annular bracket 82 over which fits a rubber cap 83. The rubber members 77 and 81 are recessed as indicated at 77c and 81c in order to permit flowing of the rubber masses when the connector is compressed and brought into the state illustrated in Fig. 11, it being understood that Fig. 10 illustrates the connector in its free uncompressed state. Compression of the connectors occurs when the nut on the bolt 80 is securely drawn down.

By virtue of the above described construction, transmission of engine vibrations to the body is largely eliminated, since the metal path from the engine to the body is interrupted twice, first, in the resilient mounting means of the engine, and second, in the connectors 76. Therefore, should some engine vibrations be transmitted to any of the transverse members, they will be absorbed by the connectors 76 provided between the transverse members and the sills 34 of the body.

Fig. 12 illustrates a modified type of the rear wheel suspension for a motor vehicle embodying the present invention. In this construction the rear transverse member 88, corresponding to the member 35 of the preferred construction, is made considerably shorter and is secured to the rear spring 68 before the running gear is assembled onto the body, and thus the member 88 forms a part of the running gear. This member is in the form of a downwardly opening channel embracing the transverse spring 68 and suitably secured thereto and to the differential housing 67. A transverse frame member 89 connects together the sills 34 and forms a part of the body structure. In the process of final assembly, the ends of the member 88 are secured to the member 89, connectors 76 similar to those illustrated in Figs. 10 and 11 being provided at the places of connection in order to interrupt the metal path between the running gear and the body. As to its other features this structure is substantially similar to that illustrated in Fig. 8. By means of the described construction an effective and advantageous load distribution in the rear wheel suspension is attained.

It will of course be understood that the present invention in one of its broader aspects contemplates the provision of a new and improved method of making an automotive vehicle, and hence, when thus considered, the method is not limited to the particular design, construction or arrangement of the body unit and running gear unit parts herein shown and described. For example, the automobile may be designed with the power plant at the rear end instead of the front end. Longitudinal springs may be employed instead of transverse springs. Other mechanical parts such as the front and rear axle assemblies, brake mechanism etc. may be varied without fundamentally departing from the method in its broader aspects. The method may be practiced where the running gear unit is of suitable conventional construction. For example, either a torque tube drive or a Hotchkiss type drive may be utilized, so far as the method broadly is concerned, and a conventional connection of the propeller shaft to the final drive or differential unit may be substituted for the drop-type propeller shaft construction shown herein and in my above mentioned co-pending applications.

One satisfactory method of assembling the body unit B and the running gear or chassis unit G is illustrated in Fig. 2. These units when completed may be conveyed to a predetermined final assembly point in the plant where the body unit may be lowered from an overhead conveyor onto the chassis unit. The latter may be built up along an assembly line and thence conveyed to the final assembly point, such as by means of channel ways 100 within which the wheels 61 travel. An endless conveyor chain 101 travels between the ways and has pivoted thereto at intervals suitable upstanding feed members 102 engageable with the front axles of the successive chassis units to move them in succession to the final assembly point. The chassis unit, as it moves to the assembly point and before attachment of the body unit thereto at the six points 78 above mentioned, is supported not only by the four wheels but also by an upstanding bar 102a secured to the conveyor chain 101 and engaging, for example, the underside of the cross frame member 49 at the locality of the universal joint 50. This supporting bar may be similar to the member 102 having a seat at its upper end to engage over the flanging of member 49 and ring 75 and providing an upright rigid strut carried by the conveyor chain for sustaining the chassis unit in proper position at a point intermediate the axles common to the rear point of suspension of the power plant and the universal joint connection between the transmission and propeller shafts. As thus assembled the running gear unit may be non-self-sustaining intermediate the front and rear wheel assemblies, the intermediate support therefor being detachable and effective to maintain the proper angularity between the propeller and drive shafts preparatory to assembly of the body and running gear units. It will be understood that the ways 100 may be elevated or a pit provided therebetween so as to facilitate attachment of the body unit and parts thereof to the chassis unit.

From the foregoing it will be seen that the running gear unit may be constructed as a frameless non-self-sustaining unit, comprising strictly running gear parts, eliminating the conventional frame, usually comprising longitudinal and X-frame members, to which the running gear parts are assembled in conventional practice, and also eliminating fenders and other strictly body parts, all of which in accordance with the present method are incorporated in the body unit.

I claim:

1. A running gear unit for a motor vehicle, comprising a front wheel suspension, a power plant assembly connected to said suspension, a rear wheel suspension, a central tube connecting said power plant assembly and said rear wheel suspension, a rigid transverse frame member mounted intermediate its ends on said tube only, and a body unit resiliently mounted on the outer ends of said member.

2. In a motor vehicle, a running gear unit comprising a front wheel suspension, a power plant assembly secured to said suspension, a rear wheel suspension, a central tube connecting said power plant assembly and said rear wheel suspension, a rigid transverse frame member mounted intermediate its ends on said tube, the outer ends of said member being otherwise unsupported from said tube; and a body unit having longitudinal sills adapted to be resiliently mounted upon the said outer ends only of said member.

3. In a motor vehicle, the combination of a body structure and a running gear structure, the body structure including spaced longitudinal frame members, the running gear structure including a series of three transverse frame members, a power plant mounted at two points on one of said transverse members and at one point on a second transverse member, and resilient means for connecting said longitudinal and transverse members together at six points.

4. In a motor vehicle, front and rear wheel suspensions, a power plant, one of said suspensions including a pair of longitudinally spaced transverse frame members, resilient means for mounting said power plant at two points on one of said members and at one point on the other member, and a propeller shaft connecting the power plant and rear wheel suspension and having a universal joint supported by said last named member.

5. In a motor vehicle having a power plant assembly, a running gear and a sprung body; two longitudinally extending sills adapted to be secured to the body before assembling the running gear thereto, a front transverse member adapted to be secured to said sills and to support the power plant at two points, an intermediate transverse member adapted to be secured to said sills and to support the power plant assembly at one point, and resilient means at the three points of power plant support and at the points of connection of said sills and transverse members.

6. In a motor vehicle, a separate body unit, a separate running gear unit, a plurality of longitudinal frame members secured to said body unit, a plurality of transverse frame members secured to said running gear unit and adapted to be connected to said longitudinal frame members in the process of final assembly of said units, a power plant assembly resiliently mounted on said transverse members, and resilient connectors at the places of connection of said transverse and said longitudinal members, whereby the metal path from any point on the power plant assembly to any point on the body unit is interrupted twice.

7. In a motor vehicle, a body structure, a running gear, two longitudinal frame members secured to said body structure, a plurality of transverse members, the running gear being secured thereto, said transverse members being adapted to be secured to said longitudinal frame members in the process of final assembly of the vehicle, a power plant resiliently mounted at three points on said transverse members, and resilient connectors at the places of connection of said transverse and said longitudinal members, whereby the metal path from the power plant to the body structure is interrupted twice.

8. In a motor vehicle, front and rear wheel suspensions, a power plant, one of said suspensions including a pair of longitudinally spaced transverse frame members, resilient means for mounting said power plant at two points on one of said members and at one point on the other member, a propeller shaft having a universal joint supported by said last named member, and a body resiliently connected to the ends of said frame members.

9. In a motor vehicle, the combination of a body structure and a running gear structure, the body structure including spaced longitudinal frame members, the running gear structure including front and rear wheel suspensions, a central tube connecting said suspensions, and three rigid transverse frame members, the intermediate transverse frame member being mounted centrally on said tube; a power plant mounted at two points on the front transverse frame member and at one point on the intermediate transverse frame member, and resilient means for connecting said longitudinal and transverse members together at six points.

10. In a motor vehicle, the combination of a body structure and a running gear structure; the latter including front and rear wheel suspensions, a central tube connecting said suspensions, and three rigid transverse frame members, the intermediate transverse frame member being mounted centrally on said tube; a power plant mounted at two points on the front transverse frame member and at one point on the intermediate transverse frame member, and resilient means for connecting said body structure and transverse members together at six points.

JOHN TJAARDA.